US010933689B2

(12) United States Patent
Moore

(10) Patent No.: US 10,933,689 B2
(45) Date of Patent: Mar. 2, 2021

(54) OMNI-WHEEL BRAKE DEVICES AND METHODS FOR BRAKING AN OMNI-WHEEL

(71) Applicant: Toyota Motor North America, Inc., Plano, TX (US)

(72) Inventor: Douglas A. Moore, Fairview, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/682,434

(22) Filed: Nov. 13, 2019

(65) Prior Publication Data

US 2020/0391545 A1     Dec. 17, 2020

Related U.S. Application Data

(60) Provisional application No. 62/860,495, filed on Jun. 12, 2019.

(51) Int. Cl.
*B60B 19/00* (2006.01)
*B60B 19/12* (2006.01)
(Continued)

(52) U.S. Cl.
CPC ............ *B60B 19/003* (2013.01); *B60B 19/12* (2013.01); *B60T 1/04* (2013.01); *F16D 49/16* (2013.01);
(Continued)

(58) Field of Classification Search
CPC .......... B61H 1/00; B61H 13/20; B61H 13/22; B61H 13/24; B61F 3/08; B60T 1/04;
(Continued)

(56) References Cited

U.S. PATENT DOCUMENTS

2005/0183896 A1* 8/2005 Fenelli ................ B66F 9/07577
180/65.22
2008/0018167 A1    1/2008 Fuji
(Continued)

FOREIGN PATENT DOCUMENTS

GB          2408692 A     6/2005
JP          3820239 B2    9/2006
(Continued)

*Primary Examiner* — Robert A. Siconolfi
*Assistant Examiner* — San M Aung
(74) *Attorney, Agent, or Firm* — Dinsmore & Shohl LLP

(57) ABSTRACT

An omni-wheel including a hub, a plurality of rollers, and a braking system. The plurality of rollers are circumferentially arranged about the hub and arranged radially outward from the hub, where each roller of the plurality of rollers is secured to the hub by a roller mount. The braking system includes a first braking lever, having a first braking surface, pivotally secured to the roller mount, a second braking lever, having a second braking surface, pivotally secured to the roller mount, opposite the first braking lever, and an actuator arranged to rotate the first braking lever in a first rotational direction and the second braking lever in a second rotational direction. The first braking surface and the second braking surface contact at least one roller of the plurality of rollers when the first braking lever and the second braking lever are rotated by the actuator.

20 Claims, 5 Drawing Sheets

(51) Int. Cl.
　　　*F16D 49/16*　　(2006.01)
　　　*B60T 1/04*　　(2006.01)
　　　*F16D 125/68*　　(2012.01)
　　　*F16D 121/14*　　(2012.01)

(52) U.S. Cl.
　　　CPC ...... *F16D 2121/14* (2013.01); *F16D 2125/68* (2013.01)

(58) Field of Classification Search
　　　CPC ....... B60B 19/003; B60B 19/12; F16D 49/16; F16D 2121/14; F16D 2125/68; B60G 17/0165; B60G 2800/019; B60L 50/50; B60K 11/04; B60K 7/0007; B60K 2001/0438; B62D 51/02; B62D 61/00
　　　USPC .......................... 188/56, 53, 58, 52, 55, 213
　　　See application file for complete search history.

(56) References Cited

U.S. PATENT DOCUMENTS

| | | |
|---|---|---|
| 2010/0243342 A1 | 9/2010 | Wu et al. |
| 2012/0181846 A1* | 7/2012 | Liddiard ................. B60B 19/12 301/5.23 |
| 2016/0121709 A1 | 5/2016 | Shin |
| 2016/0270988 A1* | 9/2016 | Diaz-Flores ............ A61G 5/046 |
| 2017/0210407 A1* | 7/2017 | Warwick ................... B62B 9/08 |
| 2017/0210444 A1* | 7/2017 | Yada ................... B60B 27/0015 |
| 2018/0050563 A1 | 2/2018 | Zhang et al. |

FOREIGN PATENT DOCUMENTS

| | | |
|---|---|---|
| WO | 2011041915 A1 | 4/2011 |
| WO | 2011113562 A2 | 9/2011 |

\* cited by examiner

OMNI-WHEEL BRAKE DEVICES AND METHODS FOR BRAKING AN OMNI-WHEEL

CROSS-REFERENCE TO RELATED APPLICATIONS

This application claims the benefit of U.S. Provisional Application No. 62/860,495, filed Jun. 12, 2019, the entire contents of which is incorporated by reference in its entirety.

TECHNICAL FIELD

The present specification generally relates to omni-wheel brake devices and methods for braking an omni-wheel and, more specifically, to omni-wheel brake devices and methods for braking an omni-wheel which utilize pivoting braking levers.

BACKGROUND

Omni-wheels are wheels with rollers around the circumference that are perpendicular to the circumferential direction. This allows an omni-wheel to operate as a traditional wheel, which would be rolled in the circumferential direction of the wheel (i.e., the longitudinal direction). Additionally, an omni-wheel not only rolls in the circumferential direction, but can also be rolled along its rollers touching the ground perpendicular to the circumferential direction (i.e., the lateral direction). This allows for an increase in maneuverability when compared to traditional wheels. However, current omni-wheels may not include braking mechanisms which can brake the rollers of the omni-wheel to prevent rotation. Additionally, current braking mechanism may only be capable of braking all of the rollers simultaneously, or none of the rollers.

Accordingly, there is a need for alternative omni-wheel braking devices and methods that can brake the rollers of omni-wheels to prevent lateral movement, while also allowing for selective engagement of the rollers of omni-wheels.

SUMMARY

According to a first aspect, an omni-wheel may include a hub, a plurality of rollers, and a braking system. The plurality of rollers are circumferentially arranged about the hub and arranged radially outward from the hub, where each roller of the plurality of rollers is secured to the hub by a roller mount. The braking system includes a first braking lever, having a first braking surface, pivotally secured to the roller mount, a second braking lever, having a second braking surface, pivotally secured to the roller mount, opposite the first braking lever, and an actuator arranged to rotate the first braking lever in a first rotational direction and the second braking lever in a second rotational direction. The first braking surface and the second braking surface contact at least one roller of the plurality of rollers when the first braking lever and the second braking lever are rotated by the actuator.

According to a second aspect, an omni-wheel according to the previous aspect, further including a first braking wheel and a second braking wheel, wherein the first braking wheel and the second braking wheel are axially displaced by the actuator in order to rotate the first and second braking levers.

According to a third aspect, an omni-wheel according to any of the previous aspects, wherein the first braking wheel and the second braking wheel are arranged on supports secured to the hub.

According to a fourth aspect, an omni-wheel according to any of the previous aspects, wherein each roller of the plurality of rollers of the omni-wheel comprises a first braking lever and a second braking lever.

According to a fifth aspect, an omni-wheel according to any of the previous aspects, wherein the first braking wheel and the second braking wheel are operatively arranged to engage the first braking lever and the second braking lever of a corresponding roller contacting the ground.

According to a sixth aspect, an omni-wheel according to any of the previous aspects, wherein the first braking lever and the second braking lever only prevent rotation of the roller contacting the ground According to a seventh aspect, an omni-wheel according to any of the previous aspects, wherein the first braking lever and the second braking lever are biased to be disengaged with the roller when not rotated by the actuator.

According to an eighth aspect, wherein the roller mounts are rotatably secured to the hub.

According to a ninth aspect, an omni-wheel may include a hub, a plurality of rollers, and a braking system. The plurality of rollers are circumferentially arranged about the hub and arranged radially outward from the hub, where each roller of the plurality of rollers is secured to the hub by a plurality of roller mounts. The braking system includes a plurality of braking devices arranged about the shaft. Each braking device includes a first braking lever, having a first braking surface, pivotally secured to a roller mount of the plurality of roller mounts, and a second braking lever, having a second braking surface, pivotally secured to the roller mount of the plurality of roller mounts, adjacent the first braking lever. The first braking surface and the second braking surface contact a roller of the plurality of rollers. An actuator is arranged to rotate the first braking lever in a first rotational direction and the second braking lever in a second rotational direction.

According to a tenth aspect, an omni-wheel according to any of the previous aspects, further including a first braking wheel and a second braking wheel, wherein the first braking wheel and the second braking wheel are axially displaced by the actuator in order to rotate the first and second braking levers.

According to an eleventh aspect, an omni-wheel according to any of the previous aspects, wherein the first braking wheel and the second braking wheel are arranged on supports secured to the hub.

According to a twelfth aspect, an omni-wheel according to any of the previous aspects, wherein the first braking wheel and the second braking wheel are axially displaced by the actuator.

According to a thirteenth aspect, an omni-wheel according to any of the previous aspects, wherein the first braking wheel and the second braking wheel are operatively arranged to engage the first braking lever and the second braking lever of a braking device having a corresponding roller contacting the ground.

According to a fourteenth aspect, an omni-wheel according to any of the previous aspects, wherein the first braking lever and the second braking lever only prevent rotation of the roller contacting the ground.

According to a fifteenth aspect, an omni-wheel according to any of the previous aspects, wherein the first braking lever and the second braking lever are biased to be disengaged with the roller when not rotated by the actuator.

According to a sixteenth aspect, an omni-wheel according to any of the previous aspects, wherein the plurality of roller mounts are rotatably secured to the hub.

According to a seventeenth aspect, a method of braking an omni-wheel may include rotating a first braking lever in a first rotational direction with an actuator, rotating the second braking lever in a second rotational direction, opposite the first rotational direction with the actuator, and contacting a roller of the omni-wheel with the first braking lever and the second braking lever, wherein contacting the roller prevents rotation of the roller.

According to an eighteenth aspect, a method of braking an omni-wheel according to any of the previous aspects, further including displacing a first braking wheel axially along a track in a first axial direction with the actuator to contact the first braking lever, and displacing a second braking wheel axially along the track in a second axial direction with the actuator to contact the second braking lever. The axial displacement of the first and second braking wheel rotates the first and second braking levers.

According to a nineteenth aspect, a method of braking an omni-wheel according to any of the previous aspects, wherein the first braking lever and second braking lever contact the roller only when the roller is contacting the ground.

According to a twentieth aspect, a method of braking an omni-wheel according to any of the previous aspects, wherein the first braking wheel disengages the first braking lever and the second braking wheel disengages the second braking lever when the roller is no longer contacting the ground.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Omni-wheels having a braking device are disclosed herein. Omni-wheels allow for both longitudinal and lateral movement of a vehicle equipped with the omni-wheels, without having to turn the wheels. Additionally, by being able to selectively brake the rollers of an omni-wheel, the transition between longitudinal movement and lateral movement can be seamless, while also occurring simultaneously.

Figure 1:
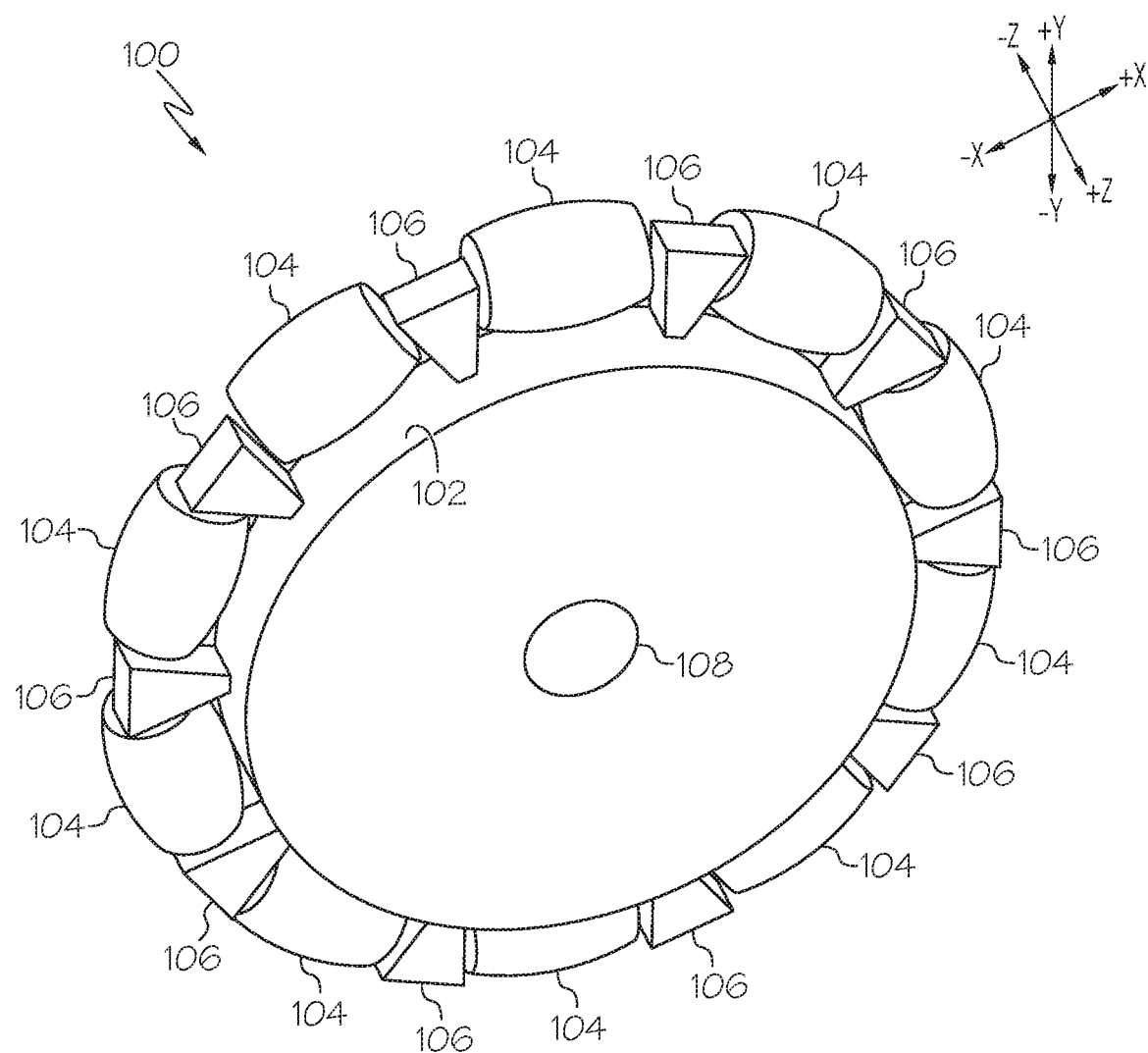
FIG. 1 schematically depicts an example omni-wheel, according to one or more embodiments shown or described herein.

FIG. 1 generally depicts an example omni-wheel having a braking system arranged within the hub of the omni-wheel. The braking system may include braking devices having a plurality of rollers circumferentially arranged about the shaft and arranged radially outward from the shaft. The braking device may include a plurality of braking levers arranged on the roller mounts. The roller mounts may be arranged about the shaft. The plurality of braking levers may be arranged between the hub and the plurality of rollers. The braking levers may be rotated by an actuator, rotating the plurality of braking levers in a rotational direction to contact the plurality of rollers, preventing rotation of the rollers. Various embodiments of the braking device for omni-wheels will be described in greater detail herein.

As used herein, the term "longitudinal direction" refers to the forward-rearward direction (i.e., in the +/− X-direction of the depicted coordinate axes). The term "lateral direction" refers to the cross direction (i.e., in the +/− Z-direction of the depicted coordinate axes), and is transverse to the longitudinal direction. The term "vertical direction" refers to the upward-downward direction (i.e., in the +/− Y-direction of the depicted coordinate axes). As used herein, "upper" and "above" are defined as the positive Y direction of the coordinate axis shown in the drawings. "Lower" and "below" are defined as the negative Y direction of the coordinate axis shown in the drawings. Further, the terms "outboard" as used herein refers to the relative location of a component with respect to a centerline. The term "inboard" as used herein refers to the relative location of a component with respect to the centerline. Because the vehicle structures may be generally symmetrical about a centerline, the direction to which use of terms "inboard" or "outboard" and refer may be mirrored about the centerline when evaluating components positioned along opposite sides.

Referring again to FIG. 1, an example omni-wheel 100 is depicted. As illustrated, the omni-wheel 100 may include a hub 102, a plurality of rollers 104, a plurality of roller mounts 106, and a shaft 108. As will be described in greater detail herein, the arrangement of the roller 104 on the outer circumference of the omni-wheel 100 allows for the omni-wheel 100 to be translated in both the longitudinal and lateral directions without having to turn the omni-wheel 100. The rollers 104 of the omni-wheel 100 are separately rotatable from one another. It is noted that the present omni-wheel 100 may be used to move any type of device including terrestrial vehicles, wheel chairs, carts, robots, etc. The omni-wheel 100 may be non-rotatably coupled to the shaft 108 to allow power to be transferred down the shaft 108 to the omni-wheel 100.

Figure 2:
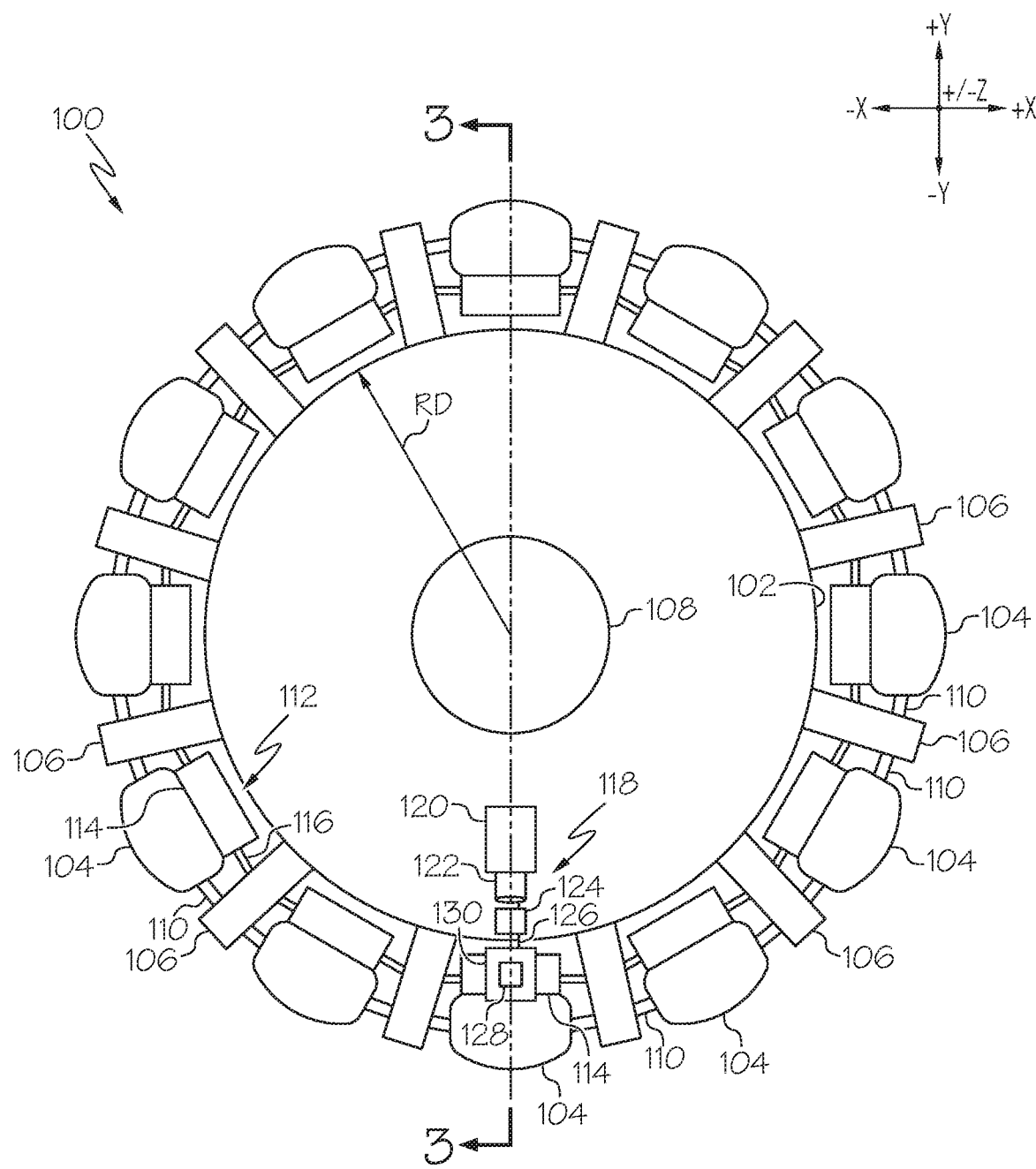
FIG. 2 schematically depicts the omni-wheel of FIG. 1 as viewed along the +/− Z-axis of the depicted coordinate axes, according to one or more embodiments shown or described herein.

Referring now to FIG. 2, the example omni-wheel 100 of FIG. 1 is depicted with a portion of the hub 102 removed. The omni-wheel 100 may include a plurality of braking devices 112, with each braking device 112 including a first braking lever 114 and a second braking lever 115 (shown in FIG. 3A). The plurality of braking levers 114, 115 may be arranged concentrically about the shaft 108 of the omni-wheel 100.

Still referring to FIG. 2, the rollers 104 may be barrel-shaped, cylindrical, frusto-conical, or the like. The rollers 104 may be arranged on the outer circumference of the hub 102 to contact the ground in either the longitudinal or lateral direction of travel. The rollers 104 are rotatably connected to the roller mounts 106 by a plurality of axles 110. A single axle 110 may pass completely through a roller 104 and secure the roller 104 to the roller mounts 106 arranged adjacent to the roller 104. Additionally, in an example embodiment, two (2) separate axles 110 may be used on either side of a roller 104 to secure the roller 104 to the adjacent roller mounts 106. The roller 104 may be manufactured of a hard rubber material, but other suitable materials may be used. The rollers 104 are arranged to ensure a smooth transition between each roller 104 as the omni-wheel 100 travels in the longitudinal direction, rotating in the X-Y plane. The outer surface of the rollers 104 may include grooves or treads which provide additional friction to the rollers 104 when contacting the ground. The rollers 104 may be radially offset from the hub 102 in the radial direction RD. It should be appreciate that other configurations of the rollers 104 are possible and that embodiments are not limited by the illustrated roller arrangement shown.

Referring still to FIG. 2, the plurality of braking devices 112 may each include a first braking lever 114 and a second braking lever. 115 The braking levers 114, 115 are arranged concentrically about the hub 102 and in close proximity to the outer surface of a roller 104. It is noted that the braking lever 115 is not visible in FIG. 2 but is shown in FIG. 3. The braking levers 114 are secured to the roller mounts 106 by axles 116 and the braking levers 115 are secured to the roller mounts 106 by axles 117 (see FIG. 3). The braking levers 114, 115 are configured to contact the rollers 104 in order to prevent lateral rotation of the rollers 104. Additionally, the braking levers 114, 115 may be a material with high coefficient of friction for contacting the rollers 104. The braking levers 114, 115 may be rotatably and/or slidably engaged with the roller mounts 106 via the axles 116, 117.

The number of braking devices 112 arranged within the omni-wheel 100 may correspond to the amount of rollers 104 arranged on the omni-wheel 100, where each roller 104 has a corresponding first braking lever 114 and second braking lever 115, which can selectively brake the roller 104. Additionally, only a single braking device 112 may be used to either brake a single roller 104, or to brake multiple rollers 104 braking levers 114, 115 what are arranged to contact multiple rollers 104 simultaneously.

In a disengaged, passive state, the braking levers 114, 115 are disengaged with the rollers 104. In an engaged, activated state, the braking levers 114, 115 are engaged with the rollers 104. By contacting the rollers 104 with the braking levers 114, 115, rotation of the rollers 104 in the lateral direction (i.e., Y-Z plane) is prevented. The prevention of rotation of the rollers 104 in the lateral direction may increase maneuverability of the omni-wheel 100 in such a way as to prevent unwanted lateral movement of the omni-wheel 100. In other words, the omni-wheel 100, in an engaged, activated state preventing the rotation of the rollers 104, will function as a traditional wheel, only allowing rotation of the omni-wheel 100 in the longitudinal direction (i.e., X-Y plane) until the braking device 112 is activated to release the braking levers 114, 115 from the outer surface of the roller 104.

Still referring to FIG. 2, the example omni-wheel 100 includes a braking system 118. The braking system 118 may generally include an actuator 120, a piston 122, a lever 124, a compliant member 126, a first track 128, a second track 129 (shown in FIG. 3A), a first sliding mount 130, and a second sliding mount 131 (shown in FIG. 3A). It should be understood that embodiments may have more or fewer components than is shown in FIG. 2. The actuator 120 may be arranged within the hub 102 or another area of the vehicle which the omni-wheel 100 is secured to.

Figure 3A:
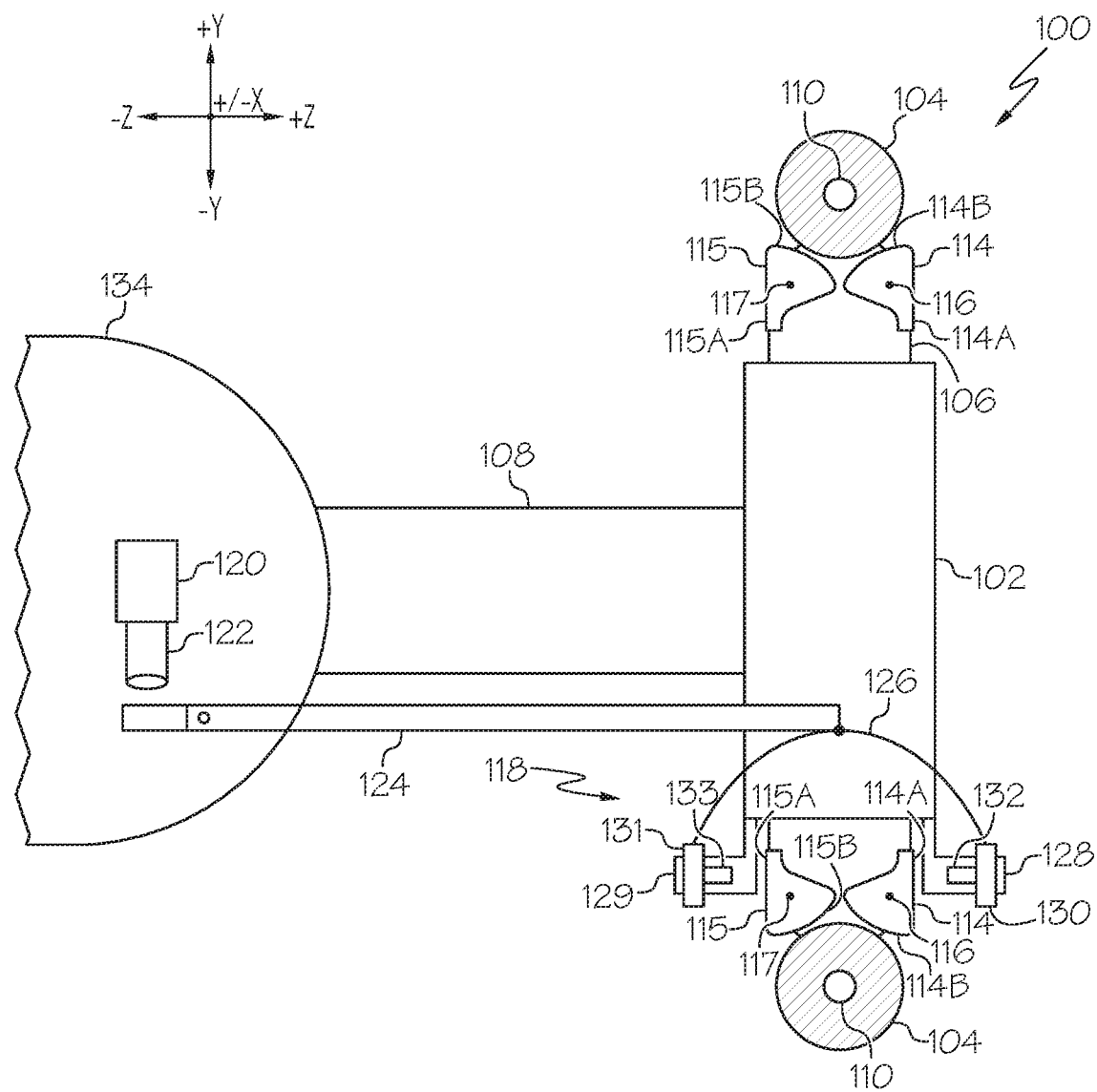
FIG. 3A schematically depicts a cross-sectional view of the omni-wheel of FIG. 2 taken along line 3-3 as viewed along the +/− X-axis of the depicted coordinate axes, according to one or more embodiments shown or described herein.
Figure 3B:
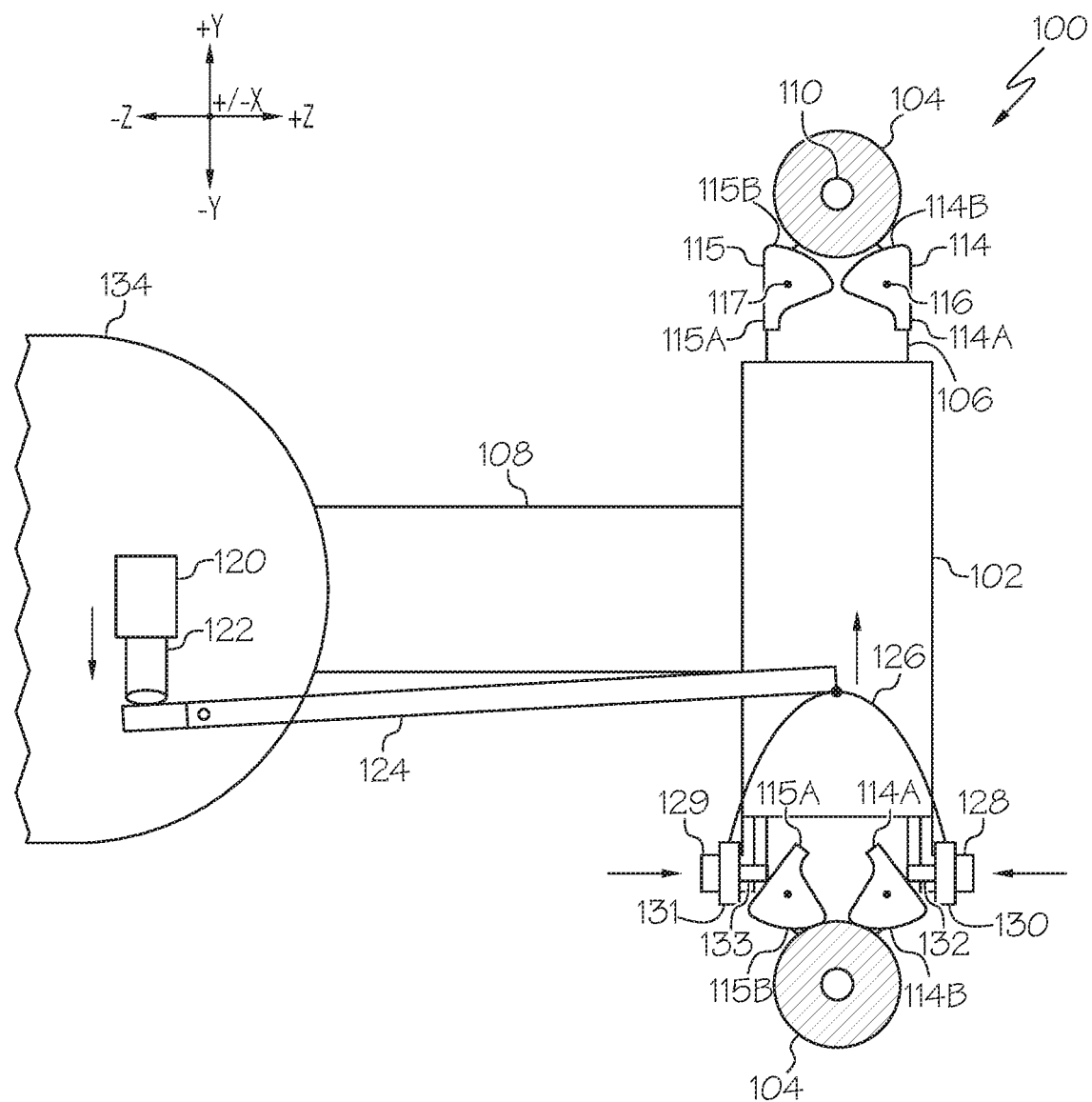
FIG. 3B schematically depicts a cross-sectional view of the omni-wheel of FIG. 2 taken along line 3-3 as viewed along the +/− X-axis of the depicted coordinate axes, according to one or more embodiments shown or described herein.

Referring now to FIGS. 3A and 3B, a cross-sectional view of the omni-wheel 100 taken along line 3-3 in FIG. 2 is shown. As noted above, the braking levers 114, 115 contact the rollers 104 to prevent lateral movement until the braking devices 112 are disengaged. The braking devices 112 are transitioned between engaged and disengaged states by the actuator 120 coupled to the braking levers 114, 115 via the piston 122, lever 124, compliant member 126, and sliding mounts 130, 131 for rotating the braking levers 114, 115 to contact the rollers 104. The actuator 120 may be arranged within the hub 102 or shaft 108, or may be arranged within the vehicle 134 which the omni-wheel 100 is secured to. Additionally, multiple actuators 120 may be used, with each braking devices 112 having a separate actuator 120, or each braking lever 114, 115 having its own actuator 120. The actuator 120 may be electronically or mechanically controlled in order to displace the piston 122.

The braking system 118 may include a first track 128 having a first sliding mount 130 slidably engaged on the first track 128, and a second track 129 having a second sliding mount 131 slidably engaged on the second track 129. In embodiments, the first track 128 and the second track 129 may be secured to the hub 120, where the hub 102 does not rotate. The roller mounts 106 may rotate along the outer surface of the hub and be powered by a connection between the rollers mounts 106 and the shaft 108. Since the hub 102 does not rotate, the first track 128 and the second track 129 are always arranged to be at the point on the omni-wheel 100 closet to the ground. Additionally, since the first track 128 and the second track 129 may be arranged at a single position on the omni-wheel 100, the first sliding mount 130 and the second sliding mount 131 may be able to engage the braking levers 114, 115 of each braking device 112 as the roller 104 corresponding to each braking device 112 contacts the ground in a seamless transition between braking devices 112.

A first braking wheel 132 may be arranged on the first sliding mount 130. A second braking wheel 133 may be arranged on the second sliding mount 131. In embodiments, the first braking wheel 132 and the second braking wheel 133 may be rotatably secured to the first sliding mount 130 and the second sliding mount 132, respectively. Additionally, the braking levers 114 may include a displacement surface 114A and a braking surface 114B. The braking levers 115 may include a displacement surface 115A and a braking surface 115B. The first braking wheel 132 contacts the first braking lever 114 along the displacement surface 114A, and the second braking wheel 133 contacts the second braking lever 115 along the displacement surface 115A. The first sliding mount 130 is laterally displaced in the −Z direction along the first track 128, and the second sliding mount 131 is laterally displaced in the +Z direction along the second track 129 when the actuator 120 transitions from a retracted state (FIG. 3A) to an extended state (FIG. 3B). In embodiments, since the braking wheels 132, 133 may be rotatably secured to the sliding mounts 128, 129, the braking wheels 132, 133 may rotate with minimal friction along the displacement surfaces 114A, 115A of braking levers 114, 115 of a braking device 112 as a corresponding roller 104 to the braking device 112 contacts the ground.

Referring particularly to FIG. 3A, the braking device 112 is shown in a disengaged state, where the braking levers 114, 115 are not contacting the rollers 104, and the first sliding mount 130 and the second sliding mount 131 are laterally displaced along the Z-axis from the first braking lever 114 and the second braking lever 115, respectively. In embodiments, the braking levers 114, 115 are shaped and designed to ensure that the braking levers 114, 115 pivot the braking surfaces 114B, 115B away from the rollers 104 to allow the rollers 104 to rotate and the omni-wheel 100 can move in the lateral direction. However, the braking levers 114, 115 may be biased using a spring or other tensions devices (not shown) to ensure the braking levers 114, 115 do not contact the rollers 104 in a disengaged state. Additionally, the sliding mounts 130, 131 may be biased laterally outward along their respective tracks 128, 129 via a spring or tensioning device (not shown) to ensure that the braking levers 114, 115 are not forced to rotate through contact with the sliding mounts 130, 131.

Referring now to FIG. 3B, the braking levers 114, 115 of the roller 104 contacting the ground is shown in an engaged state, where the braking levers 114, 115 are contacting the roller 104, and the braking levers 114, 115 are rotated in opposite rotational directions in order to contact the rollers with the braking surfaces 114B, 115B. As the actuator 120 is transitioned from a retracted to an extended state, the piston 122 abuts the lever 124. The lever 124 may be pivotably mounted so that as the piston 122 is displaced in the −Y direction and abuts a distal end of the lever 124, the opposite distal end of the lever 124 will be displaced in the +Y direction. The compliant member 126, which may be configured as a wire, for example, is secured to the opposite distal end of the lever 124, so that as the lever 124 is pivoted in the +Y direction, the compliant member 126 is also displaced in the +Y direction. The compliant is secured to the first sliding mount 130 at a first end and the second sliding mount 131 at a second end, such that as the compliant member 126 is displaced in the +Y direction, the compliant member 126 will laterally displace the first sliding mount 130 in the −Z direction and the second sliding mount 131 in the +Z direction. As the first sliding mount 130 and the second sliding mount 131 are displaced along the Z-axis, the first braking wheel 132 will abut the displacement surface 114A of the first braking lever 114, and the second braking wheel 133 will abut the displacement surface 115A of the second braking lever 115. As the braking wheels 132, 133 abut the displacement surfaces 114A, 115B, the first braking lever 114 will be pivoted in a first rotational direction, and the second braking lever 115 will be pivoted in a second rotational direction, opposite the first rotational direction. In embodiments, a single braking lever may be used to prevent lateral rotation of the rollers 104, with a single braking lever contacting an outer surface of a roller 104.

The actuator 120 may be controlled by a processor or controller (not shown) communicatively coupled to the actuator 120. A user may operate the actuator 120 to transition to a disengaged state when lateral movement of the omni-wheel 100 is desired. When the braking levers 114, 115 are displaced rotational inward along the X-axis, the braking surfaces 114B, 115B of the braking levers 114, 115 contact the rollers 104 and prevent lateral rotation of the rollers 104 through a friction force exerted between the rollers 104 and the braking levers 114, 115.

In some embodiments, a gap may form between the rollers 104 and the braking levers 114, 115 as the omni-wheel 100 rotates in the longitudinal direction (i.e., X-Y plane) and the rollers 104 contact the ground since the braking wheels 132, 133 are arranged to interact with the braking levers 114, 115 of corresponding rollers 104 contacting the ground by rotating the braking levers 114, 115. As the rollers 104 rotate in the X-Y plane and eventually contact the ground, the corresponding braking levers 114, 115 of a braking device 112 may be transitioned to a disengaged state, allowing the corresponding roller 104 to rotate. Additionally, in an embodiment, a gap may not form between the rollers 104 contacting the ground and the braking levers 114, 115. However, the friction force between the rollers 104 and the braking levers 114, 115 may be reduced, which would allow for rotation of the rollers 104 while still in near contact with the braking levers 114, 115.

Due to the configuration of the tracks 128, 129 and the braking wheels 132, 133, only the braking levers 114, 115 with corresponding rollers 104 contacting the ground will be in a engaged state when the actuator 120 extends the piston 122, preventing rotation of only the rollers 104 contacting the ground. As the braking levers 114, 115 and rollers 104 rotate about the shaft 108 in the X-Y plane, with the hub remaining stationary, the braking levers 114, 115 of a corresponding roller 104 will abut against the braking wheels 132, 133 as the roller 104 approaches and contacts the ground. As the rollers 104, which were previously not contacting with the ground approach contacting the ground, their corresponding braking levers 114, 115 will transition from a disengaged state to an engaged state by being rotated by abutting the braking wheels 132, 133. In embodiments, the braking levers 114, 115 and the braking wheels 132, 133 are arranged and designed so that the actuator 120 may remain in an extended state, thereby axially displacing the braking wheels 132, 133 along the Z-axis, so that the braking levers 114, 115 of braking devices 112 rotating around the hub 102 and are rotated by the braking wheels 132, 133 without the need for the actuator 120 to transition between a retracted and extended state for each individual braking device. This allows for a seamless transition between braking devices 112 as the omni-wheel 100 rotates in the longitudinal direction. As the rollers 104 continue to rotate about the omni-wheel 100, the braking wheels 132, 133 will abut the braking levers 114, 115 in an engaged state as the rollers 104 remain in contact with the ground. However, as the rollers 104 begin to lose contact with the ground due to their angular position on the omni-wheel 100, the corresponding braking levers 114, 115 will be rotated opposite rotational directions along their axles 116, 117 in order to disengage the roller 104.

Still referring to FIGS. 3A and 3B, the actuator 120 may be actuated by a user (not shown) and may be a mechanical or electrical actuator. As depicted in FIGS. 3A and 3B, the actuator 102, piston 122, and lever 124 are laterally offset from the hub 102 in the −Z direction and connected to the sliding mounts 130, 131 via the compliant member 126. However, in embodiments, the actuator 120 may be arranged within the hub 102 of the omni-wheel 100, or the actuator 120 may be directly coupled to the braking levers 114, 115 without the need for a lever 124 and compliant member 126.

Figure 4:
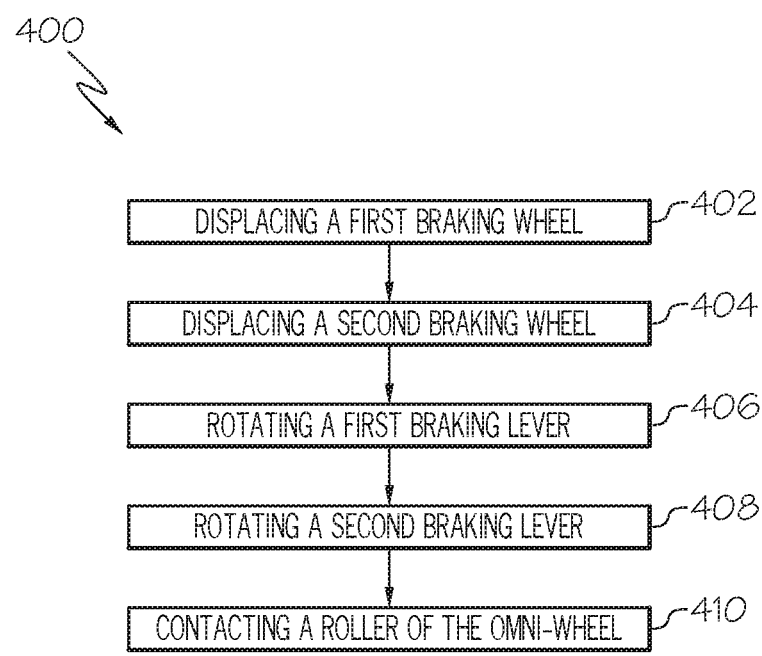
FIG. 4 depicts a method of using a braking device for an omni-wheel, according to one or more embodiments shown or described herein.

Referring now to FIG. 4, a flow chart depicting a method 400 for operating the braking device of the omni-wheel 100 (as illustrated in FIGS. 3A & 3B) is depicted. It is noted that while a number of steps are shown in a specific order, embodiments may include a greater or fewer number of steps in varying orders without departing from the scope of the present disclosure. To begin, at step 402 the method 400 may include displacing a first braking wheel axially along a first track in a first axial direction with the actuator to contact the first braking lever. For example, and with reference to FIGS. 3A and 3B, the omni-wheel 100 may include a first sliding mount 130 arranged on a first track 128, with a first braking wheel 132 rotatably arranged on the first sliding mount 130. The first sliding mount 130 may be arranged to be laterally displaced along the first track 128. Additionally, the omni-wheel 100 may include a second sliding mount 131 arranged on a second track 129, with a second braking wheel 133 rotatably arranged on the second sliding mount 131. The second sliding mount 131 may be arranged to be laterally displaced along the second track 129. The first sliding mount 130 may be displaced by the actuator 120.

Referring again to FIG. 4, step 404 may include displacing a second braking wheel axially along a second track in a second axial direction with the actuator to contact the second braking lever. For example, and with reference to FIGS. 3A and 3B, the omni-wheel 100 may include a second sliding mount 131 arranged on a second track 129, with a second braking wheel 133 rotatably arranged on the second sliding mount 131. The second sliding mount 131 may be arranged to be laterally displaced along the second track 129. The second sliding mount 131 may be displaced by the actuator 120.

Referring again to FIG. 4, step 406 may include rotating a first braking lever in a first rotational direction with an actuator. For example, and with reference to FIGS. 3A and 3B, as the first sliding mount 130 is laterally displaced along the first track 128, the first braking wheel 132 will abut the displacement surface 114A of the first braking lever 114, causing the first braking lever 114 to pivot in a first rotational direction.

Referring again to FIG. 4, step 408 may include rotating a second braking lever in a second rotational direction, opposite the first rotational direction with the actuator. For example, and with reference to FIGS. 3A and 3B, as the second sliding mount 131 is laterally displaced along the second track 129, the second braking wheel 133 will abut the displacement surface 115A of the second braking lever 115, causing the second braking lever 115 to pivot in a second rotational direction, opposite the first rotational direction.

Referring again to FIG. 4, step 410 may include contacting a roller of the omni-wheel with the first braking lever and the second braking lever, wherein contacting the roller prevents rotation of the roller. For example, and with reference to FIGS. 3A and 3B, the pivoting braking levers 114, 115 may be rotated sufficiently in their respective rotational directions in order to contact a roller 104 with braking surfaces 114B, 115B. As the braking surface s114B, 115B abut the roller 104, lateral rotation of the roller 104 is prevent.

It should now be understood that embodiments described herein are directed to omni-wheels having a braking device arranged therein. A braking device may include a plurality of rollers circumferentially arranged about the shaft and arranged radially outward from the shaft. The braking device may include a plurality of braking levers arranged on roller mounts. The roller mounts may be arranged about the shaft and may be rotatably arranged on the hub. The plurality of braking levers may be arranged between the hub and the plurality of rollers. The braking levers may be rotated by an actuator, rotating the plurality of braking levers in a rotational direction to contact the plurality of rollers, preventing lateral rotation of the rollers as the rollers contact the ground.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An omni-wheel, comprising:
a hub;
a plurality of rollers circumferentially arranged about the hub and arranged radially outward from the hub, wherein each roller of the plurality of rollers is secured to the hub by a roller mount; and
a braking system, comprising:
a first braking lever, having a first braking surface, pivotally secured to the roller mount;
a second braking lever, having a second braking surface, pivotally secured to the roller mount, opposite the first braking lever; and
an actuator arranged to rotate the first braking lever in a first rotational direction and the second braking lever in a second rotational direction;
wherein the first braking surface and the second braking surface contact at least one roller of the plurality of rollers when the first braking lever and the second braking lever are rotated by the actuator.

2. The omni-wheel of claim 1, further comprising a first braking wheel and a second braking wheel, wherein the first braking wheel and the second braking wheel are axially displaced by the actuator in order to rotate the first and second braking levers.

3. The omni-wheel of claim 2, wherein the first braking wheel and the second braking wheel are arranged on supports secured to the hub.

4. The omni-wheel of claim 3, wherein each roller of the plurality of rollers of the omni-wheel comprises a first braking lever and a second braking lever.

5. The omni-wheel of claim 4, wherein the first braking wheel and the second braking wheel are operatively arranged to engage the first braking lever and the second braking lever of a corresponding roller contacting the ground.

6. The omni-wheel of claim 5, wherein the first braking lever and the second braking lever only prevent rotation of the roller contacting the ground.

7. The omni-wheel of claim 1, wherein the first braking lever and the second braking lever are biased to be disengaged with the roller when not rotated by the actuator.

8. The omni-wheel of claim 1, wherein the roller mounts are rotatably secured to the hub.

9. An omni-wheel, comprising:
a hub;
a plurality of rollers circumferentially arranged about the hub and arranged radially outward from the hub, wherein each roller of the plurality of rollers is secured to the hub by a plurality of roller mounts; and
a braking system, comprising:
a plurality of braking devices arranged about the shaft, each braking device comprising:
a first braking lever, having a first braking surface, pivotally secured to a roller mount of the plurality of roller mounts; and
a second braking lever, having a second braking surface, pivotally secured to the roller mount of the plurality of roller mounts, adjacent the first braking lever;
wherein the first braking surface and the second braking surface contact a roller of the plurality of rollers; and
an actuator arranged to rotate the first braking lever in a first rotational direction and the second braking lever in a second rotational direction.

10. The omni-wheel of claim 9, further comprising a first braking wheel and a second braking wheel, wherein the first braking wheel and the second braking wheel are axially displaced by the actuator in order to rotate the first and second braking levers.

11. The omni-wheel of claim 10, wherein the first braking wheel and the second braking wheel are arranged on supports secured to the hub.

12. The omni-wheel of claim 11, wherein the first braking wheel and the second braking wheel are axially displaced by the actuator.

13. The omni-wheel of claim 12, wherein the first braking wheel and the second braking wheel are operatively arranged to engage the first braking lever and the second braking lever of a braking device having a corresponding roller contacting the ground.

14. The omni-wheel of claim 13, wherein the first braking lever and the second braking lever only prevent rotation of the roller contacting the ground.

15. The omni-wheel of claim 9, wherein the first braking lever and the second braking lever are biased to be disengaged with the roller when not rotated by the actuator.

16. The omni-wheel of claim 9, wherein the plurality of roller mounts are rotatably secured to the hub.

17. A method of braking an omni-wheel, the method comprising:

rotating a first braking lever in a first rotational direction with an actuator;

rotating a second braking lever in a second rotational direction, opposite the first rotational direction with the actuator; and contacting a roller of the omni-wheel with the first braking lever and the second braking lever, wherein contacting the roller prevents rotation of the roller.

18. The method of claim 17, further comprising:

displacing a first braking wheel axially along a first track in a first axial direction with the actuator to contact the first braking lever; and displacing a second braking wheel axially along a second track in a second axial direction with the actuator to contact the second braking lever, wherein the axial displacement of the first braking wheel and the second braking wheel rotates the first and second braking levers.

19. The method of claim 18, wherein the first braking lever and second braking lever contact the roller only when the roller is contacting the ground.

20. The method of claim 19, wherein the first braking wheel disengages the first braking lever and the second braking wheel disengages the second braking lever when the roller is no longer contacting the ground.

* * * * *